United States Patent [19]

Viegas et al.

[11] Patent Number: 5,598,709
[45] Date of Patent: Feb. 4, 1997

[54] APPARATUS AND METHOD FOR VAPORIZING A LIQUID CRYOGEN AND SUPERHEATING THE RESULTING VAPOR

[75] Inventors: Herman H. Viegas; Bradley G. Ellingson, both of Bloomington, Minn.; Michael A. Aronov, Beachwood; Roger D. Sheridan, Wadsworth, both of Ohio

[73] Assignee: Thermo King Corporation, Minneapolis, Minn.

[21] Appl. No.: 560,919

[22] Filed: Nov. 20, 1995

[51] Int. Cl.⁶ .................................................. F17C 9/02
[52] U.S. Cl. .......................................... 62/50.2; 165/111
[58] Field of Search ................................ 62/50.2, 50.3; 165/111

[56] References Cited

U.S. PATENT DOCUMENTS

| | | | |
|---|---|---|---|
| 3,712,073 | 1/1973 | Arenson | 62/50.2 |
| 4,036,028 | 7/1977 | Mandrin | 62/50.3 |
| 4,201,191 | 5/1980 | Zink et al. | 62/50.2 |
| 5,095,709 | 3/1992 | Billiot | 62/50.3 |
| 5,107,906 | 4/1992 | Swenson et al. | 62/50.3 |
| 5,259,198 | 11/1993 | Viegas et al. | |
| 5,267,443 | 12/1993 | Roehrich et al. | |
| 5,267,446 | 12/1993 | Viegas et al. | |
| 5,305,825 | 4/1994 | Roehrich et al. | |
| 5,315,840 | 5/1994 | Viegas et al. | |

Primary Examiner—Ronald C. Capossela

[57] ABSTRACT

Both an apparatus and method are provided for vaporizing a liquid cryogen and super heating the resulting vapor into a heated gas. The apparatus includes a combustion-type heat source which may burn a fuel such as propane that generates water-containing combustion gases, and a vaporizer coil having an inlet conduit for receiving a flow of a liquid cryogen, such as liquid carbon dioxide, and an outlet conduit for expelling vaporized cryogen. An annular casing surrounds but is spaced apart from the vaporizer coil. The casing isolates the vaporizer coil from contact with water-containing combustion gases generated by the heat source, thereby preventing the formation of unwanted water and ice on the coil, while at the same time transferring heat from these gases to the coil by thermal radiation. A superheating coil is serially connected to the vaporizer coil to further heat the vaporized cryogen. Both the vaporizer coil and super heater coil are compactly configured and disposed within a heat-insulating housing for minimizing heat losses. The device is particularly well adapted for use as a defroster or a heater in a mobile cryogenic refrigeration system.

22 Claims, 2 Drawing Sheets

APPARATUS AND METHOD FOR VAPORIZING A LIQUID CRYOGEN AND SUPERHEATING THE RESULTING VAPOR

BACKGROUND OF THE INVENTION

This invention generally relates to devices for vaporizing liquid cryogens, and is particularly concerned with a compact device for vaporizing a liquid cryogen and superheating the resulting vapor to a temperature useful for defrosting and/or heating the evaporator coil of a mobile cryogenic refrigeration system.

Devices for vaporizing a liquid cryogen and superheating the resulting vapor are known in the prior art. Such devices may be used in cryogenic refrigeration systems where a cryogenic liquid is expanded in an evaporator coil to cool a conditioned space, which may be a truck or tractor-trailer. In these systems, unwanted ice deposits accumulate on the exterior surface of the evaporator coil from ambient humidity. A cryogenic vaporizer and superheater is used to create hot gases that circulate through the evaporator coil to melt the unwanted ice deposits. Such devices comprise a vaporizer coil formed from a plurality of windings of metal tubing which are heated by ambient air to vaporize the liquid cryogen into a gas. The outlet of the vaporizer coil is connected to the inlet of a superheating coil likewise formed by windings of metal tubing. The windings of the vaporizer and superheating coils are convectively heated by the combustion gases of a combustion-type heat source, such as a propane burner. The inlet of the vaporizer coil is connected via a mode valve to the source of the liquid cryogen used in the refrigeration system, which may be liquid carbon dioxide, liquid nitrogen, or the like. The outlet of the superheating coil may in turn be connected to the evaporator coil of the cryogenic refrigeration system to either defrost the evaporator coil, or to heat it when it is desired to heat the conditioned space.

In operation, when the defrost or heating cycle of the refrigeration system is actuated, liquid cryogen is admitted to the vaporizer coil while ambient air circulates around the windings of the coil. The resulting convective transfer of heat causes the liquid cryogen entering the vaporizer coil to boil and to vaporize so that it leaves the outlet conduit of this coil in a gaseous state. The gaseous cryogen then flows to the superheating coil where more convective heat transfer is accomplished by the contact of the hot combustion gases of the propane burner on the exterior surface of the superheating coil. By the time the gaseous cryogen exits the superheating coil, it is at a temperature sufficiently high to supply the desired quantity of heat to defrost or heat the evaporator coil of the refrigeration system. Various flow control valves in the system isolate the evaporator coil from liquid cryogen while directing the superheated gas into the coil. After a sufficient amount of superheated gas has been circulated through the interior of the evaporator coil to melt the unwanted ice deposits on its exterior, or to heat the conditioned space to a desired temperature, the positions of the valves in the system are changed and the propane burner is shut off until the next defrosting or heating cycle.

While such prior art vaporizing and superheating devices have generally shown themselves to be effective for their intended purpose, the applicants have observed two major shortcomings in the design of these devices which significantly compromises their effectiveness.

First, under certain temperature and humidity conditions, a layer of moisture or ice formed from ambient humidity can build up on the surface of the vaporizer coil. The resulting moisture layer can seriously interfere with the transfer of further ambient heat to the liquid cryogen causing liquid cryogen to enter the superheating coil. Intuitively, it would appear that the exposure of the windings of the superheating coil to the flames of the propane burner would effectively vaporize and superheat any liquid cryogen that spilled over from the vaporizer coil. However, because water is a byproduct of the combustion of most fossil fuels, when such water-containing combustion gases come into contact with a coil containing a cryogenic liquid, the temperature of the cryogenic liquid is low enough (e.g., $-65°$ F. in the case of liquid carbon dioxide) to cause the formation of a layer of ice and water on the surface of the coil. The presence of this dynamic film of water and ice seriously impairs the efficiency of the exchange of heat between the combustion gases and the surface of the metal tubing forming the vaporizer coil. Over a period of time the problem gradually worsens and results in liquid $CO_2$ carry over from the vaporizer to the superheater and eventually the evaporator coil, rendering the entire heating/defrost operation ineffective.

Secondly, the applicants have observed that the configuration of the vaporizer and superheating coils in such prior art devices requires a considerable amount of volume. This is a particularly disadvantageous feature in the context of a cryogenic refrigeration system used on a truck or other vehicle, where a high degree of compactness is desirable to maximize the cost efficiency of the system.

Clearly, there is a need for an improved device for vaporizing and superheating a cryogenic liquid which realizes a high degree of heat transfer efficiency. Moreover, it would be desirable if such a device could be compactly constructed and installed in the limited space available in a mobile cryogenic refrigeration system so as to maximize the cost efficiency of the system.

SUMMARY OF THE INVENTION

The invention is both an apparatus and a method for vaporizing a liquid cryogen and superheating the resulting vapor that overcomes all the aforementioned shortcomings associated with the prior art. The apparatus comprises a combustion type heat source, such as a propane heater that generates water containing combustion gases; a vaporizer coil having an inlet conduit for receiving a flow of liquid cryogen, such as liquid $CO_2$, and an outlet conduit for expelling vaporized cryogen, and a casing that surrounds the vaporizer coil in a close but spaced-apart relationship for isolating the vaporizer coil from the water containing combustion gases of the heat source while efficiently transferring heat from the gases to the coil by thermal radiation. Because combustion gases do not directly contact the outer surface of the vaporizer coil, vaporized water contained within the combustion gases does not have the opportunity to form an insulative layer of water and ice on the outer surface of the coil.

In order to maximize the thermal absorption of the vaporizer coil, the exterior surfaces of the vaporizer coil are preferably dark colored. Further to enhance heat transfer, the vaporizer coil is preferably helically configured while the surrounding casing is preferably tubular in shape so as to maximize the areas of heat transfer within the space limitations of the system. The surrounding casing is closely spaced from the vaporizer coil, but does not contact it. Both the vaporizer coil and casing are preferably contained within a heat-insulated housing for reducing heat losses. Finally, the housing preferably includes a wall for directing a flow of hot combustion gases from the heat source onto both the interior and exterior surfaces of the casing so that a large percentage of the area of the vaporizer coil is simultaneously struck by thermal radiation.

The apparatus preferably includes at least one superheating coil that is serially connected to the outlet conduit of the vaporizer coil, and which is helically configured around a casing that encloses the vaporizer coil. The housing preferably includes a wall for directing combustion gases from the heat source directly on the outer surface of the superheating coil so that heat transfer takes place via convection. The vaporizer coil is designed to completely boil off all the liquid $CO_2$ and superheat it to a temperature above the freezing point of water before it exits the vaporizer coil. Such a gas temperature allows the superheating coil to be heated directly by combustion gases since there is no danger that the vaporized gas entering the superheating coil will cause localized condensation or freezing of the water-containing combustion gases on the surface of the coil. The heat source control means controls the flow of cryogen such that the maximum temperature of the $CO_2$ entering the transition between the stainless steel tubing forming the superheating coil and the copper tubing forming the evaporator coil is no more than 500° F. This is an important feature of the invention, since temperatures of over 500° F. can jeopardize the strength of the copper tubing and solder joints at this location in the system.

A second superheating coil may be provided in the apparatus to provide for the generation of larger volumes of superheated gas by reheating the $CO_2$ after it exits from the first evaporator coil. To conserve space within the housing, such a second superheating coil is helically configured in an interwound configuration with the first superheating coil. Such an interwound configuration also insures that the $CO_2$ is heated to substantially the same temperature in both superheater coils. Additionally, the reheating of the $CO_2$ gas that exits the first evaporator coil by the second superheating coil advantageously reduces the mount of cryogen used in the defrost or heating operations.

The invention further comprises a method for vaporizing a liquid cryogen by means of a combustion type heat source that generates water containing combustion gases. The method of the invention comprises the steps of admitting a flow of liquid cryogen into a vaporizer coil, providing a casing that completely surrounds the vaporizer coil in a closely spaced relationship, and then directing the combustion gases from the heat source onto the exterior surfaces of the casing so that the casing heats up and directs thermal radiation onto the exterior surfaces of the vaporizer coil.

The invention provides a compact device for vaporizing a cryogenic liquid and superheating the resulting vapor. It is particularly well adapted for use in mobile, cryogenic refrigeration systems for defrosting the cryogenic evaporator coil that cools a conditioned space and also for heating the conditioned space.

BRIEF DESCRIPTION OF THE SEVERAL FIGURES

FIG. 1 is a schematic diagram of a cryogenic refrigeration system that incorporates the vaporizer and superheater device of the invention, and FIG. 2 is a side, cross-sectional view of the vaporizer and superheater device of the invention, illustrating, inter alia, a compact configuration of the vaporizer coil and helically intertwined superheating coils.

DETAILED DESCRIPTION OF THE PREFERRED EMBODIMENT

Figure 1:
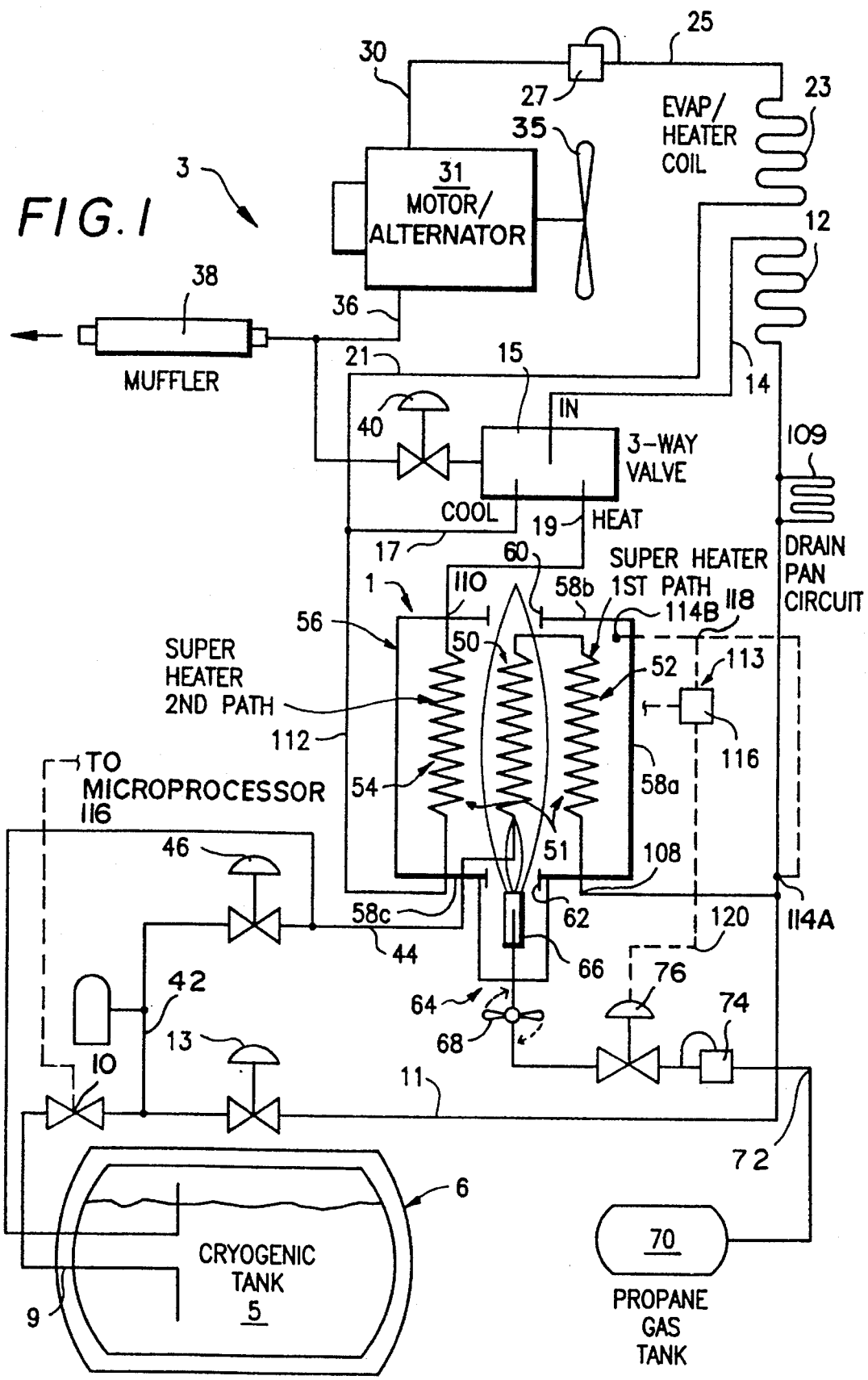

With reference now to FIG. 1, wherein like numerals designate like components throughout both the Figures, the cryogenic vaporizer and superheater device 1 is particularly adapted for use within a cryogenic refrigeration system 3 for converting a liquid cryogen such as liquid $CO_2$ or liquid nitrogen into a hot gas suitable for performing defrosting and space-heating functions.

While the principal function of the cryogenic refrigeration system 3 is to cool a conditioned space, it can also heat such a space by virtue of the cryogenic vaporizer and superheater device 1 of the invention. To facilitate a better understanding of the function of the invention in the context of such a refrigeration system, descriptions of both the refrigeration circuit and the heating circuit of the system 1 will be given. These circuits are also described in U.S. patent application Ser. No. 08/501,372 filed Jul. 12, 1995, and assigned to the Thermo King Corporation, the entire specification of which is hereby incorporated by reference.

The refrigeration circuit of the system 1 begins with a liquid supply line 9 for withdrawing liquid cryogen 5 from the insulated tank 6. The flow of cryogen through line 9 is modulated by an electronic expansion valve 10 that is in turn controlled by a microprocessor 116 that forms part of a temperature controller 113. Liquid supply line 9 is connected to inlet conduit 11 which introduces liquid cryogen into a first evaporator coil 12 that can also function as a heater coil when the system 1 is switched to a heat mode of operation. A mode valve 13 disposed in the inlet conduit 11 controls the flow of liquid cryogen into the evaporator coil 12, and is normally open during the refrigeration mode of the system 1. Expanding cryogen exiting the first evaporator coil 12 is expelled out of outlet conduit 14 into a three way valve 15. The three way valve 15 has both a cooling outlet 17 and a heating outlet 19, depending upon the mode of operation of the system 1. In the cooling mode of operation, the three way valve 15 routes all of the expanding cryogen it receives from the first evaporator coil 12 through cooling outlet 17, and from thence into the inlet conduit 21 of the second evaporator coil 23. Like the first evaporator coil 12, the second evaporator coil 23 can also be used as a heating coil during the heating mode of the system 1. Because the heating outlet 19 is completely shut off during the cooling mode of operation, virtually none of the expanding cryogen will flow backwards through the conduit 21 into the cryogenic vaporizer and superheater device 1. Expanded cryogen (which is now in a completely gaseous state) exits the outlet conduit 25 of the second evaporator coil 23. Conduit 25 includes a back pressure regulator valve 27 which is modulated via a control system (not shown) in order to maintain a sufficient back pressure (above 80 psia) in the line to insure that the cryogen remains in a completely fluid state. This is of particular importance when liquid $CO_2$ is used as the cryogen, since $CO_2$ can coexist in all three phases (i.e., solid, liquid, and gas) under certain temperature and pressure conditions. After passing through the back pressure regulator valve 27, the gaseous cryogen enters the previously mentioned motor/alternator 31 via motor inlet conduit 30.

The heating circuit of the system 3 begins with the cryogen line 42 having an inlet connected to liquid cryogen supply line 9, and an outlet connected to an inlet conduit 44 leading into the vaporizer and superheater device 3 of the invention. A mode valve 46 is positioned between inlet conduit 44 and the cryogenic line 42 for admitting cryogen to the vaporizer and superheater device 1 when the system 3 is in a heating mode, whereupon valve 13 is closed to prevent liquid cryogen from flowing into the evaporator coils 12,23.

The vaporizer and superheater device 1 generally comprises a vaporizer coil assembly 50 and a superheating coil assembly 51 which includes first and second superheating coils 52 and 54. While the coils 52 and 54 are shown as being structurally apart from one another in the schematic diagram of FIG. 1 in order to more clearly indicate the flow patterns of the cryogen through the device 1, these coils 52 and 54 are in fact helically intertwined in the fashion illustrated in FIG. 2 in order to achieve an advantageous compactness. Both the vaporizer coil assembly 50 and the superheating coil assembly 51 are contained within a housing 56 having side, upper and lower insulated walls 58a,b,c. The upper wall 58b is generally circular in shape, and includes a circular exhaust outlet 60 around its center. The bottom wall 58c is likewise circular, and includes a circular flame inlet 62 around its center for receiving the flames of a propane burner 64.

Propane burner 64 is comprised of a combustion nozzle 66, a blower 68 for supplying air for combustion and for directing flames generated by the nozzle 66 into the inlet 62 of the housing 56, and a propane tank 70 for supplying the nozzle 66 with a flow of propane or other fossil fuel. A combustion nozzle 66 and the propane tank 70 are interconnected via fuel line 72, which in turn includes a regulator valve 74 for modulating the flow of propane to the nozzle 66, as well as a fuel shut-off valve 76 for completely stopping a flow of fuel to the nozzle 66.

Figure 2:
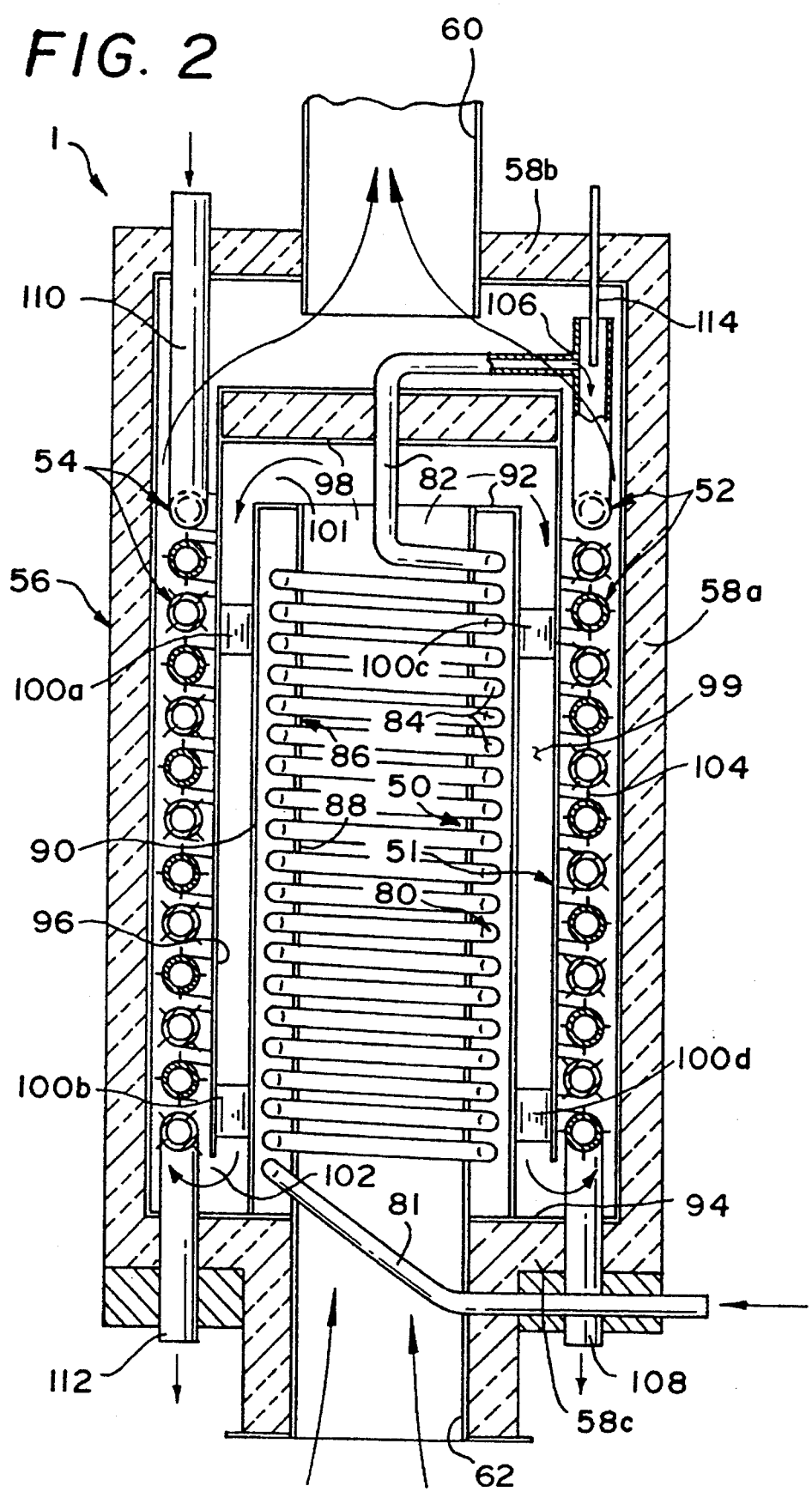

With reference now to FIG. 2, the vaporizer coil assembly 50 includes a helical vaporizer coil 80 having an inlet conduit 81 for receiving liquid cryogen from the conduit 44, and an outlet conduit 82 for discharging vaporized cryogen into the superheating coil assembly 51. Connected between the inlet and outlet conduits 81,82 are a plurality of helical windings 84 whose function is to provide a large surface area between the cryogen flowing through the coil 80, and heat radiated thereon.

A tubular casing 86 surrounds the vaporizer coil 80 in order to prevent direct contact between flames generated by the propane burner 64 and the exterior surface of the helical windings 84. Casing 86 also functions to convert convective heat applied to its outer surface by the flames and combustion gases of the burner 64 into radiant heat which is absorbed by the helical windings 84. For this purpose, the casing 86 is formed from cylindrical inner and outer walls 88,90. The annular gaps between the upper and lower ends of the casing 86 are covered by an annular capping wall 92, and an annular lower wall 94 as shown. These walls 92,94 are likewise preferably formed from stainless steel sheet material. In order to maximize the efficiency of the radiant heat transfer between the casing 86 and the vaporizer windings 84, the outer surface of the helical windings 84 of the vaporizer coil 80 are colored black, either by the electro-deposition of a black oxide, by heat-resistant paint, or by heat treating the outer surface. Preferably, the inner surfaces of the casing walls are closely spaced to, but do not contact, the outer surfaces of the coil windings 84. Contact between these walls would cause the walls of the casing 86 to adopt cryogenic temperatures near the inlet end of the coil 80, which in turn could create undesirable, heat-insulating ice and water deposits around the outer surface of the cylindrical inner wall 88. In order to maximize the efficiency of the radiant heat exchange between the stainless steel casing 86 and the outer surfaces of the vaporizer coil windings 84, the spacing between these components should be fairly close. Accordingly, in the preferred embodiment, these walls should be spaced from the windings 84 no more than about one-half the diameter of the windings 84 at their closest points. To insure that there is some radiant heat transfer at all points around every winding 84, the windings 84 should be spaced apart from one another a distance of at least one half of the diameter of the tubing forming the coil windings 84.

The vaporizer and superheater device 1 of the invention further includes a cylindrical combustion gas guide wall 96 which circumscribes the casing 86, and which is capped by a circular upper flame guide wall 98 which is likewise spaced apart from the annular capping wall 92 of the casing 86. Spacers 100a–d which may be formed from small sections of stainless steel tubing are disposed between the outer walls of the casing 86 and the inner surface of the cylindrical flame guide wall 96 both to maintain proper spacing, as well as to provide support for the vaporizer coil assembly 50. The space between the casing 86 and the inner surface of the cylindrical flame guide wall 96 defines an inner annular chamber, while the gap between the upper flame guide wall 98 and the annular capping wall 92 of the casing 86 defines an annular gap 101 that admits hot combustion gases into the chamber 99. The hot combustion gases diverted downwardly by the upper flame guide wall 98 into the inner annular chamber 99 via annular gap 101 efficiently heat the cylindrical outer wall 90 of the casing 86, such that both the inner and outer walls 88,90 of the casing 86 effectively operate to generate and transfer radiant heat to the outer surfaces of the evaporator coils 84.

The bottom edge of the cylindrical flame guide wall 96 does not extend, on its bottom portion, completely flush with the lower wall 94, but instead is spaced as shown to form still another annular gap 102. This gap 102 serves to direct hot combustion gases exiting the inner chamber 99 into an outer annular chamber 104 defined between the outer wall of the cylindrical flame guide wall 96 and the inner surface of the housing sidewall 58a, where the superheating coil assembly 51 is located. These hot combustion gases flow through the helically intertwined, first and second superheating coils 52,54 such that the heat is convectively exchanged between these gases and the vaporized cryogen flowing through these coils. To enhance heat transfer, each of the superheating coils 52,54 is finned as shown in FIG. 2. After flowing completely through the outer annular chamber 104, the combustion gases are expelled from the housing 56 through the exhaust outlet 60.

The outlet conduit 82 of the vaporizer coil 80 is connected to an inlet opening 106 of the first superheating coil 52. The superheating coil 52 ends in an outlet conduit 108 which in turn is connected to inlet conduit 11 of the first evaporator coil 12. The heating outlet 19 of the three way valve 15 is connected to an inlet conduit 110 of the second superheating coil 54. The second superheating coil 54 terminates in an outlet conduit 112 which in turn is connected to the inlet conduit 21 of the second evaporator coil 23.

With reference again to FIG. 1, to control the temperature of the cryogenic gas exiting the vaporizer coil assembly 50 and the first and second superheating coils 52,54, a temperature controller 113 is provided. Temperature controller 113 includes a temperature probe 114A located at the outlet conduit 108 of the first superheating coil 52 or alternatively at 114B at the inlet conduit 106 of the first superheating coil 52. In either case, the probe 114A or B is connected to an input of a microprocessor 116 via an electrical line 118. The output of microprocessor 116 is in turn connected to propane shut-off valve 76 and to electronic expansion valve 10.

When the refrigeration system 3 is operated in the heating mode, the microprocessor opens shut-off valve 76 and propane burner 64 is ignited. The $CO_2$ cryogen flow rate is controlled via the microprocessor controlled electronic expansion valve 10 to allow the stainless steel casing 86 surrounding the vaporizer coil 80 to heat up to a temperature sufficient to vaporize liquid cryogen and to raise its temperature to above the freezing point of water. Next, liquid cryogen from conduit 44 is introduced into the inlet conduit 81 of the vaporizer coil 80. The resulting vaporized cryogen exits the outlet conduit 82, where it is introduced into the inlet 106 of the first superheating coil 52. At this junction in the vaporizer and superheater device 1, if the temperature probe 114B is used, probe 114B measures the temperature of the gaseous cryogen exiting the vaporizer coil 80. The microprocessor 116 of the temperature controller 113 regulates the electronic expansion valve 10 so that the temperature of the exiting cryogenic gas at the outlet 106 is 33° F. Because the temperature of the gas at this point in the device 1 is above freezing, it cannot cause dynamic films of water and ice to form on the superheater coil 52. Accordingly, both the first and second superheating coils 52,54 may be heated convectively, without the need for a casing such as that surrounding the vaporizer coil 80.

In the preferred mode of the operating device 1, the temperature probe 114A is used. Probe 114A measures the temperature of the cryogenically generated gas exiting the first superheating coil 52, and the microprocessor 116 of the temperature controller 113 regulates the electronic expansion valve 10 so that the temperature of the outlet conduit 108 is approximately 500° F. This gas is admitted into the first evaporator coil 12 in the manner previously described to either thaw unwanted ice deposits from the exterior of the evaporator coil 12, or to heat the conditioned space. While it would be possible to operate the device 1 so that the temperature of the superheated gas is well above 500° F., the exposure of the copper-formed evaporator coils and solder joints 12,23 to temperatures above 500° F. could cause unwanted weakening of the metal forming these components. Accordingly, both the length of the superheating coil 52, and the operation of the electronic expansion valve 10 is controlled so that the temperature of the gas exiting the outlet conduit 108 is no more than about 500° F. A second superheating coil 54 is connected to the outlet of the first coil 52 via evaporator coil 12 and three-way valve 15 and is helically intertwined with the first superheating coil 52. Cooled gas exiting the first evaporator coil 12 has sufficient pressure to be recirculated through the second superheating coil 54 and reheated to approximately 500° F., where it is then circulated through the second evaporator coil 23. Such recirculation economizes on the amount of cryogen used in the heating cycle, a crucial factor in mobile applications where the amount of cryogen is limited. The superheating coils 52,54 are the same length and helically interwined to insure that the gas is heated to substantially the same temperature in each. The helical interwinding of the first and second superheating coils 52,54 in combination with the concentric arrangement of these coils around the vaporizer coil assembly 50 and the compact, torturous combustion gas path defined by the cylindrical and upper flame guide walls 96,98 allow the device 1 to effectively implement a defrosting and heating mode of operation to the system 3 with only minimal space requirements.

What is claimed:

1. An apparatus for vaporizing a liquid cryogen and superheating the resulting vapor, comprising:

a combustion type heat source that generates water containing combustion gases;

vaporizer coil means having an inlet conduit for receiving a flow of liquid cryogen, an outlet conduit for expelling vaporized cryogen, and casing means in thermal contact with said heat source for isolating said vaporizer coil means from said water-containing combustion gases while transferring heat from said gases to said coil means substantially by thermal radiation.

2. The apparatus of claim 1, wherein said coil means is darkly colored for facilitating absorption of thermal radiation from the casing means.

3. The apparatus of claim 2, wherein said coil means is colored black for maximizing the absorption of thermal radiation from the casing means.

4. The apparatus of claim 1, where said coil means includes a plurality of coil windings for both conducting a flow of cryogen and transferring heat to said cryogen, and said casing means completely covers said coil windings.

5. The apparatus of claim 4, wherein said coil windings are annularly arranged, and said casing means is likewise annularly arranged around said coil windings for transferring radiant heat to both inner and outer sides of said coil windings.

6. The apparatus of claim 1, further comprising a superheating coil means serially connected to the outlet conduit of the vaporizer coil means and in thermal contact with said heat source for superheating the vaporized cryogen expelled by said vaporizer coil means.

7. The apparatus of claim 6, further comprising temperature control means including a valve means for regulating a flow of cryogen through said vaporizer coil means to control the temperature of cryogen expelled from said outlet conduit.

8. The apparatus of claim 7, wherein said temperature control means controls said valve means such that the temperature of the cryogenic gases expelled by the outlet conduit of said vaporizer coil means is above 33° F.

9. The apparatus of claim 7, wherein superheated gas produced by the apparatus is connected to an evaporator coil means formed from copper, and wherein said temperature control means controls said valve means such that the maximum temperature of the evaporator coil means is about 500° F.

10. The apparatus of claim 1, further comprising a housing means for enclosing said vaporizer coil means, casing means, and superheating coil means, said housing means including an inlet for receiving combustion gases from said heat source, and an outlet for exhausting said gases.

11. An apparatus for vaporizing a liquid cryogen and superheating the resulting vapor, comprising:

a combustion type heat source that generates water containing combustion gases;

a vaporizer coil means having an inlet conduit for receiving a flow of liquid cryogen, an outlet conduit for expelling vaporized cryogen, and a plurality of coil windings for conducting a flow of cryogen while transferring heat thereto;

a casing means surrounding but spaced apart from the coil windings of said vaporizer coil means and in thermal contact with said heat source for isolating said coil windings from said water-containing combustion gases while transferring heat from said gases to said coil windings by thermal radiation, and a housing means enclosing said vaporizer coil means and casing means for reducing heat losses including an inlet for receiving combustion gases and an outlet for exhausting said gases.

12. The apparatus of claim 11, wherein both said vaporizer coil means and said surrounding casing means are annular in shape, said casing means having an inner wall, and an outer wall, and wherein said housing means includes a wall means for directing combustion gases to both said inner and outer walls of said casing means to enhance radiant heat transfer to said vaporizer coil means.

13. The apparatus of claim 12, further comprising at least one finned superheating coil means connected to the outlet conduit of said vaporizer coil means for superheating the vaporized cryogen expelled therefrom, said superheating coil means surrounding but spaced apart from said casing means and being contained in said housing means.

14. The apparatus of claim 13, wherein said housing means includes a wall means for directing combustion gases directly into contact with said superheating coil means.

15. The apparatus of claim 14, wherein said wall means of said housing means that directs combustion gases to both of said inner and outer walls of said casing means is the same wall means that directs combustion gases directly into contact with said superheating coil means.

16. The apparatus of claim 11, wherein exterior surfaces of said coil windings are darkly colored to enhance said radiant heat transfer.

17. The apparatus of claim 11, further comprising temperature control means including a valve means for regulating a flow of cryogen through said vaporizer coil means to control the temperature of cryogen expelled from said outlet conduit.

18. The apparatus of claim 17, wherein said temperature control means controls said valve means such that the temperature of the cryogenic gases expelled by the outlet conduit of said vaporizer coil means is above 33° F.

19. The apparatus of claim 18, wherein superheated gas produced by the apparatus is connected to an evaporator coil means formed from copper, and wherein said control means controls a cryogen flow rate such that the gas entering the evaporator coil means is no more than about 500° F.

20. The apparatus of claim 11, further including a second superheating coil means connected to an inlet of a second evaporator coil for reheating said cryogenic gas to about 500° F., said second superheating coil means being helically interwound with said first superheating coil means to conserve space within said housing means.

21. The apparatus of claim 11, including a second superheating coil means for reducing the consumption of cryogen during heating and defrosting cycles.

22. A method for vaporizing a liquid cryogen by means of a combustion type heat source that generates water containing combustion gases, comprising the steps of admitting a flow of liquid cryogen into a vaporizer coil means;

providing a casing means that surrounds but is spaced apart from said vaporizer coil means, and directing said water containing combustion gases onto exterior surfaces of said casing means so that said casing means heats up and directs thermal radiation onto exterior surfaces of said vaporizer coil means.

* * * * *